United States Patent [19]

Tonsor

[11] Patent Number: 4,605,264
[45] Date of Patent: Aug. 12, 1986

[54] TRACK SHOE DEFLECTION STOP FOR ENDLESS TRACK ASSEMBLIES

[75] Inventor: Andrew J. Tonsor, East Peoria, Ill.

[73] Assignee: Caterpillar Inc., Peoria, Ill.

[21] Appl. No.: 669,395

[22] Filed: Nov. 8, 1984

[51] Int. Cl.⁴ .................. B62D 55/22; B62D 55/28
[52] U.S. Cl. ............................................ 305/47; 305/54
[58] Field of Search .............. 305/39, 47, 60, 54; 198/853, 851

[56] References Cited

U.S. PATENT DOCUMENTS

| | | | |
|---|---|---|---|
| 2,495,331 | 1/1950 | Kegresse | 305/47 X |
| 3,764,185 | 10/1973 | Symmank | 305/47 |
| 4,036,538 | 7/1977 | Haslett et al. | 305/47 |
| 4,114,958 | 9/1978 | Boggs | 305/56 |
| 4,116,497 | 9/1978 | Schimpf et al. | 305/47 X |

FOREIGN PATENT DOCUMENTS

WO81/00543  3/1981  PCT Int'l Appl. ............... 55/20

Primary Examiner—David A. Scherbel
Attorney, Agent, or Firm—Claude F. White

[57] ABSTRACT

A stop member limits deflection of the outer end portions of track shoes of endless track assemblies, which support and propel earthmoving vehicles. Track-type earthmoving vehicles which use wide track shoes often experience wear and structural failures within the track assemblies as a result of vertical loading at the outer end portions of the shoes. The vertical loading of the shoes produces twisting and deflection which is transmitted to the other components of the track assembly, such as the links, pins, bushings, and seals. The deflection stop of the present invention is secured to the trailing end of a first shoe and overlaps a portion of the leading end of a second shoe. As a vertical load is applied to the second shoe, the leading end contacts the deflection stop and the load applied to the second shoe is shared with the first shoe and deflection of the second shoe is minimized.

3 Claims, 6 Drawing Figures

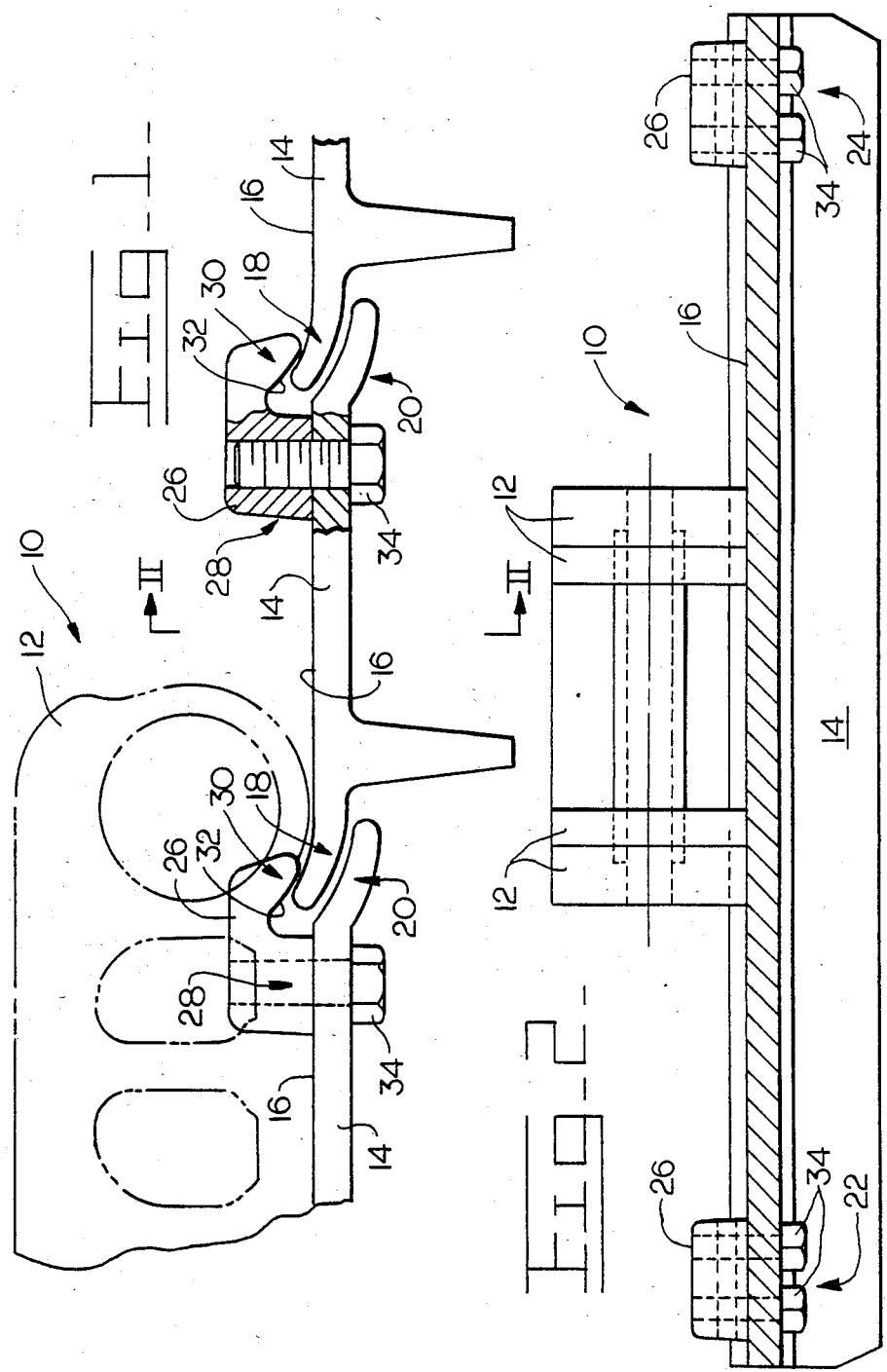

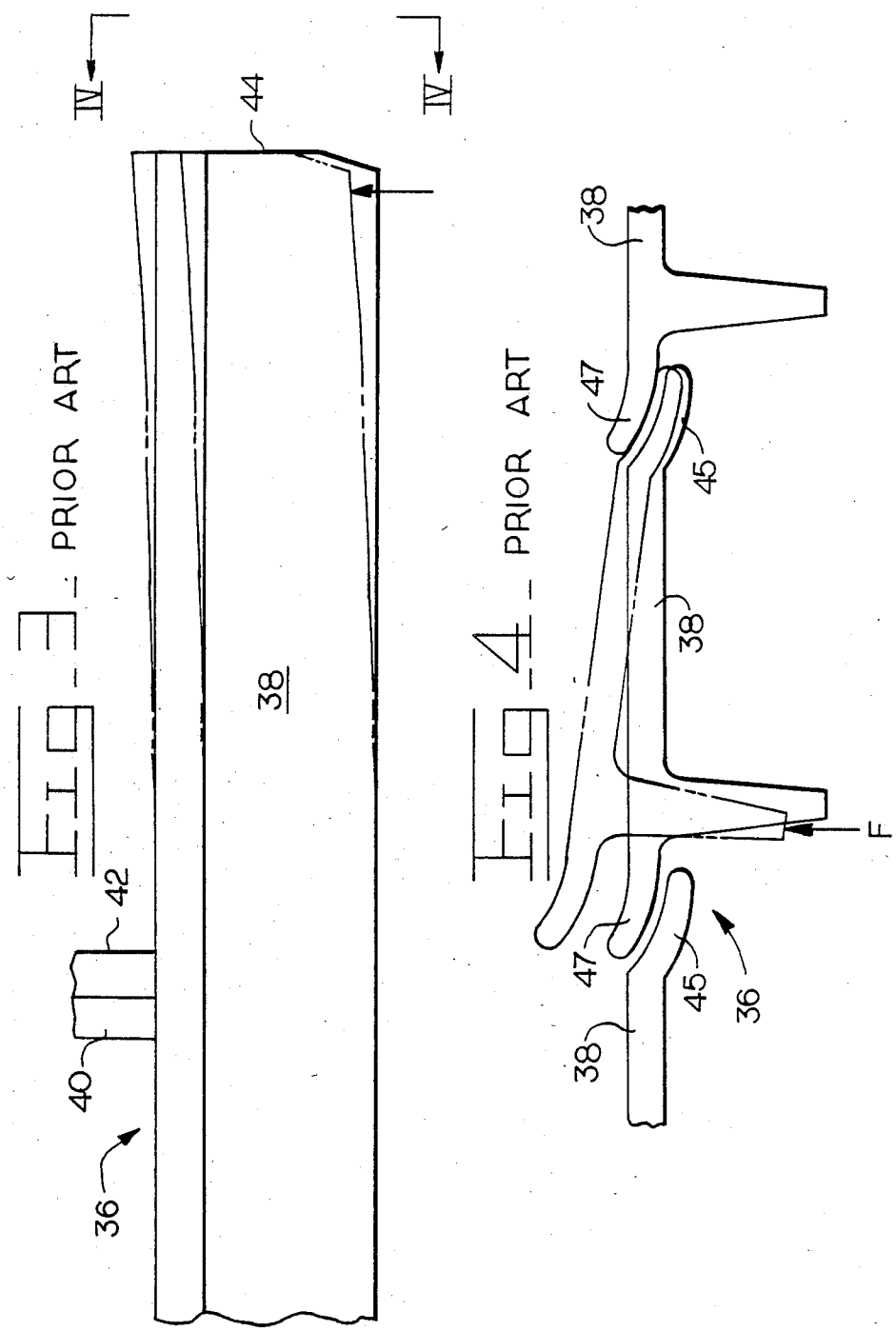

TRACK SHOE DEFLECTION STOP FOR ENDLESS TRACK ASSEMBLIES

DESCRIPTION

1. Technical Field

This invention relates generally to endless track assemblies and more particularly to stop members associated with each track shoe of the track assemblies which limit deflection of the shoes in a vertical direction when a vertical force is applied to the track shoes.

2. Background Art

Track-type vehicles, such as bulldozer, bucket loaders, and excavators, are supported and propelled by endless track chains equipped with steel track shoes. The large ground contacting area of the track shoes produces a relatively low unit ground pressure. In certain soil conditions and work applications, extra wide track shoes are employed on the vehicles to provide reduced unit ground pressure. When wide track shoes are used, vertical loads applied to the outer, unsupported ends of the shoes increases stress in the track components and twisting of the track assembly. The increase in stress can cause early hour structural failure in the track components, such as link cracking, shoe bending, and bolt loosening. The increase in twisting motion can cause endplay to develop in the track joints which results in loss of lubricant, dirt entry, and increased internal wear.

One type of construction for increasing the lateral stiffness of wide track shoes is disclosed in U.S. Pat. No. 4,128,277, issued to T. C. Meisel, Jr. on Dec. 5, 1978. In this patent, one or more stiffener members extend laterally across each track shoe and are attached to the shoes and the track links. Although this structure provides effective lateral stiffening of the wide shoes, considerable weight and expense is added to the track assembly.

Another type of construction for resisting torsional loads imposed on wide track shoes of a track assembly is disclosed in International Publication No. WO 81/00543, published on Mar. 5, 1981 to inventor T. C. Meisel, Jr. In this publication, one or more auxiliary chain assemblies interconnect the track shoes and are disposed on the outboard ends of the shoes. This structure also provides effective lateral stability to the wide track shoes, but adds a large amount of weight and cost, and is also quite complex.

The present invention is directed to overcoming one or more of the problems as set forth above.

DISCLOSURE OF THE INVENTION

In one aspect of the present invention, an endless track assembly has a plurality of interconnected track links and track shoes, with each shoe having a mounting surface, leading and trailing end portions, and outer end portions. Each of the track shoes is pivotally connected to an adjacent track shoe by the track links with the leading end portion of each shoe overlaying an associated trailing end portion of the adjacent shoe. A stop member is connected to the outer end portions of each track shoe and has a deflection stop portion which overlays the leading end portion of an adjacent shoe.

Track-type vehicles are often equipped with wide track shoes to provide low unit ground pressure, or floatation, for the vehicle. These shoes are generally connected to, and supported by, a plurality of link assemblies near the center portion of the shoes. The outer ends of the shoes are relatively unsupported and are often subjected to a vertically applied force which stresses the track components and twists the track assembly. This can cause accelerated wear and early structural failures.

The deflection stop of the present invention substantially reduces stress in the track components and twist in the track assembly by improving the sharing of vertically applied forces between adjacent shoes. By reducing the stress, the useful life of the track assembly is extended.

BRIEF DESCRIPTION OF THE DRAWINGS

FIG. 1 is a diagrammatic side elevational view of a portion of a track assembly embodying the present invention;

FIG. 2 is a diagrammatic sectional view taken generally along the lines II—II of FIG. 1;

FIG. 3 is a diagrammatic frontal view of a portion of a track assembly illustrating the problem with the prior art;

FIG. 4 is a diagrammatic side view taken generally along lines IV—IV of FIG. 3;

BEST MODE FOR CARRYING OUT THE INVENTION

Figure 5:
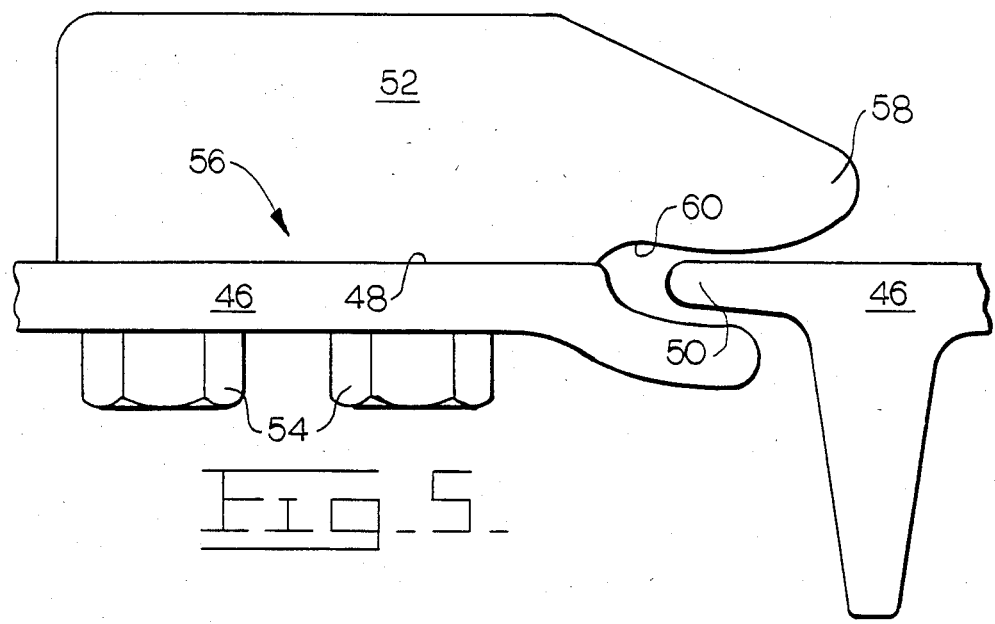
FIG. 5 is a diagrammatic side view of an alternate embodiment of the present invention; and, FIG. 6 is a diagrammatic side view of another alternate embodiment of the present invention.

Referring to the drawings, and in particular, FIGS. 1 and 2, an endless track assembly 10 includes a plurality of interconnected track links 12 and a plurality of individual track shoes 14, with each shoe 14 being pivotally connected to an adjacent shoe 14 by the track links 12. Each track shoe 14 has a mounting surface 16, a leading end portion 18, a trailing end portion 20, and first and second outer end portions 22,24. The track shoes 14 are connected together with the leading end portion 18 of each shoe 14 overlaying a trailing end portion 20 of an adjacent shoe 14.

The track assembly 10 further includes a stop member 26 having a mounting portion 28 connected to the shoe mounting surface 16 adjacent the trailing end portion of each shoe 14. A stop member 26 is connected to each of the first and second outer end portions 22,24 of each shoe 14. The stop member 26 has a deflection stop portion 30, which is spaced from the mounting portion 28, and overlays the leading end portion 18 of an adjacent track shoe 14. The mounting portion 28 and the deflection stop portion 30 define a groove 32 therebetween. The groove 32 provides clearance for the leading end portion 18 of the track shoe 14 during backbend of the track assembly 10. The stop members 26 are connected to the mounting surfaces 16 of each shoe 14 by a plurality of threaded fasteners 34. Other suitable means for connecting the stop members 26 to the mounting surfaces 16 would include bolts and nuts, and welding.

With reference to FIGS. 3 and 4, the problem of the prior art is illustrated, with respect to a track assembly 36. The track assembly includes a plurality of track shoes 38 which are pivotally interconnected by track links 40,42, as is conventional in the construction of endless track assemblies. During operation of track assembly 36, a vertically applied force "F" moves the outer end portion 44 of the track shoe 38 upwardly to the phantom line position. As shown in FIG. 4, the trailing end portion 45 of shoe 38 contacts the leading end portion 47 of the adjacent shoe 38, and the force in this area of the shoe 38 is shared by both shoes. However, the leading end portion 47 of the displaced shoe 38 is free to move upward providing no load sharing with the trailing end portion of the adjacent shoe. Repeated high vertical loading at the outer ends can lead to accelerated wear due to chain twisting and early structural failures of the track components due to high stresses.

With reference to FIG. 5, an alternate embodiment of the subject invention is shown. In this embodiment, the adjacent track shoes 46 define an essentially planer surface between the mounting surface 48 of one shoe 46 and the leading end portion 50 of the trailing shoe 46. A stop member 52 is connected to the mounting surface 48 by a plurality of fasteners 54. The stop member 52 has a mounting portion 56 and a deflection stop portion 58, which is spaced from the mounting portion 56 and overlays the leading end portion 50 of an adjacent shoe 46. The mounting portion 56 and the deflection stop portion 58 define a small groove, or cavity, 60 therebetween.

Figure 6:
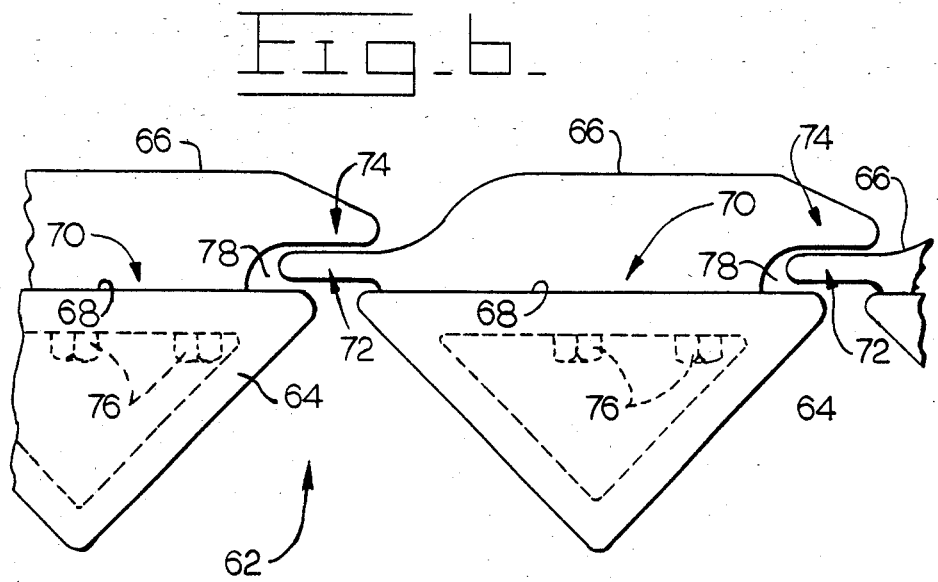

With reference to FIG. 6, another alternate embodiment of the subject invention is shown. In this embodiment, only a portion of an endless track assembly 62, including track shoes 64 and stop members 66, is shown. It is understood, however, that the total track assembly 62 includes a plurality of interconnected track links, similar to those illustrated in FIGS. 1 and 2, and that the track shoes 64 are pivotally interconnected with adjacent shoes 64 by the track links.

The track shoes 64 have a generally triangular cross-sectional configuration and have a generally planer mounting surface 68, with no overlap between the leading and trailing ends of the shoes. Each of the stop members 66 have a mounting portion 70, a forwardly extending tongue portion 72, and a rearwardly facing deflection stop portion 74. The mounting portion 70 of each stop member 66 is connected to the mounting surface 68 of the shoes 64 by a plurality of mounting means, such as fasteners 76. The deflection stop portion 74 of each stop member 66 is spaced from and overlays a portion of the mounting surface 68 of each shoe 64 and forms a slot 78 therebetween. The tongue portion 72 of each stop member 66 is adapted to fit into an adjacent slot 78.

INDUSTRIAL APPLICABILITY

The subject deflection stops 26,52,66 are particularly useful with endless track assemblies for track-type vehicles, such as bulldozers and excavators. Because track-type vehicles provide a relatively low unit ground pressure, they are often used in applications involving soft ground conditions. In severe soft underfoot conditions, track-type vehicles are often equipped with extra wide track shoes to provide an even lower unit ground pressure.

When wide track shoes are used, an upward force "F" on the shoes (FIGS. 3 and 4), caused by running over a rock, for example, can move the outer end portion 44 of the shoes 38 upward and produce twisting and deflection of the shoe, resulting in high stress in the track components and increased twist of the track assembly. As shown in FIG. 4, the trailing end portion 45 of the displaced shoe 38 contacts the leading end portion 47 of the adjacent shoe 38 and the load is shared between the shoes. However, there is nothing to restrict upward movement of the leading end portion 47 of the non-retained, displaced shoe 38 and the above-noted twisting and deflection occurs.

The subject deflection stops 26,52 restrict the upward movement of the leading end portions 18,50 when a vertical force is applied to the shoes 14,46. Since the stops 26,52 are secured to adjacent track shoes 14, a portion of the force is transferred into the adjacent shoes and the force is shared by the shoes. Deflection stops 26,52 improves vertical load sharing between shoes and reduces the twist in the track assembly. This reduces the stress in the track components and extends the useful life of the track assembly.

In the embodiment of FIG. 6, the shoes 64 do not have overlapping leading and trailing end portions. Therefore, similar structure is provided in the deflection stop members 66. When the shoe 64 is moved upwardly, the tongue portion 72 of the stop member 66, which is attached to the displaced shoe 64, contacts the stop portion 74 and the vertical force is shared by the adjacent shoes 64 to restrict shoe twisting and deflection. If the opposite end of the shoe 64 moves upward, the corner of the shoe contacts the stop portion 72 of the stop member 66 on the adjacent shoe 64 and the upward motion is restricted.

Other aspects, objects, and advantages of this invention can be obtained from a study of the drawings, the disclosure, and the appended claims.

I claim:

1. An endless track assembly, comprising:
   a plurality of pivotally interconnected track links;
   a plurality of individual track shoes, each having a mounting surface, a leading end portion and a trailing end portion, first and second outer end portions, and each being pivotally connected to an adjacent track shoe by said track links with each leading end portion overlaying an associated trailing end portion of an adjacent shoe;
   a replaceable stop member releaseably connected to each of said outer end portions and having a mounting portion in direct contact with and rigidly connected to said shoe mounting surface adjacent said trailing end portion, a deflection stop portion spaced from said mounting portion and overlaying said leading end portion of an adjacent shoe and defining a groove formed between said mounting portion and said deflection stop portion; and
   means for releaseably connecting said stop members to said mounting surfaces.

2. The endless track assembly, as set forth in claim 1, wherein the leading end portion of each track shoe is adapted to contact said deflection stop portion of said replaceable stop member under the influence of a vertical force and said contact is adapted to maintain said shoe against further deflection and reduce stress in said track assembly.

3. An endless track assembly, comprising:
   a plurality of pivotally interconnected track links;
   a plurality of individual track shoes, each having a generally triangular cross-sectional configuration, a mounting surface, and being connected to respective leading and trailing track shoes by said track links;
   a plurality of stop members each having a mounting portion, a forwardly extending tongue portion, and a rearwardly facing deflection stop portion, each of said stop members being connected by said mounting portion to the mounting surface of each of said track shoes with the deflection stop portion of each stop member overlaying a portion of the respective shoe and forming a slot therebetween, said tongue portion adapted to fit into said slot; and,
   means for connecting said stop members to said track shoes.

* * * * *